(12) United States Patent
Ge

(10) Patent No.: US 12,141,473 B2
(45) Date of Patent: Nov. 12, 2024

(54) PERFORMANCE TUNING FOR A MEMORY DEVICE

(71) Applicant: Micron Technology, Inc., Boise, ID (US)

(72) Inventor: Liang Ge, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 170 days.

(21) Appl. No.: 17/646,256

(22) Filed: Dec. 28, 2021

(65) Prior Publication Data

US 2023/0205456 A1 Jun. 29, 2023

(51) Int. Cl.
*G06F 3/06* (2006.01)

(52) U.S. Cl.
CPC ............ *G06F 3/0659* (2013.01); *G06F 3/061* (2013.01); *G06F 3/0673* (2013.01)

(58) Field of Classification Search
CPC ...... G06F 3/061; G06F 3/0611; G06F 3/0659; G06F 3/0673; G06F 3/0679; G06F 3/0688
See application file for complete search history.

(56) References Cited

U.S. PATENT DOCUMENTS

2005/0015648 A1* 1/2005 Tawada ................. G11B 27/36

\* cited by examiner

*Primary Examiner* — Larry T MacKall
(74) *Attorney, Agent, or Firm* — Holland & Hart LLP

(57) ABSTRACT

Methods, systems, and devices for performance tuning for a memory device are described. In some examples, a memory system may receive a command (e.g., a read command or a write command) that includes an indicator. The indicator may instruct the memory system to suppress one or more portions of the command. For example, the command may be received by an interface of the memory system and the controller may instruct the memory system to suppress one or more operations performed by a processor of the memory system, a storage controller of the memory system, or both. Upon suppressing one or more operations associated with the command, the memory system may output a response to the test system, which may allow for the test system to tune one or more performance aspects of the memory system.

25 Claims, 8 Drawing Sheets

PERFORMANCE TUNING FOR A MEMORY DEVICE

FIELD OF TECHNOLOGY

The following relates generally to one or more systems for memory and more specifically to performance tuning for a memory device.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some memory systems may include various hardware or software components for executing commands received from a host system or testing device. For example, a memory system may include a frontend (e.g., a hardware interface), a flash translation layer (e.g., (FTL), a processor), and a backend (e.g., a storage controller) configured to receive and execute various commands. In some instances, it may be desirable to perform a testing operation on the memory system to determine whether errors occur at the different hardware or software components during execution of a command, which may allow the host system or testing device to tune performance aspects of the memory system. However, in traditional memory systems, the host system or testing device may be notified only of the occurrence of an error when processing the command. In other words, the host system or testing device may be unable to discern, specifically, where the error occurred.

A memory system configured to suppress aspects of a command is described herein. In some examples, a memory system may receive a command (e.g., a read command, a write command) from a host system or testing device. The command may include an indicator that instructs the memory system to suppress one or more operations associated with executing the command. For example, the indicator may include a first value, which may instruct the memory system to suppress operations performed by its FTL (e.g., its processor) and backend (e.g., its storage controller). In other examples, the indicator may indicate a second value, which may instruct the memory system to suppress operations performed by its backend. In either example, the memory system may be configured to generate a response indicating completion of the command, despite the command not being fully executed. Accordingly, by suppressing one or more operations associated with executing the command, the host system or testing device may be able to discern where performance issues occur. For example, the host system or testing device may be able to determine that performance issues occur at the front end, at the FTL, or at the backend, which may allow the host system or testing device to tune the performance of the memory system in order to improve its overall performance.

Figure 1:
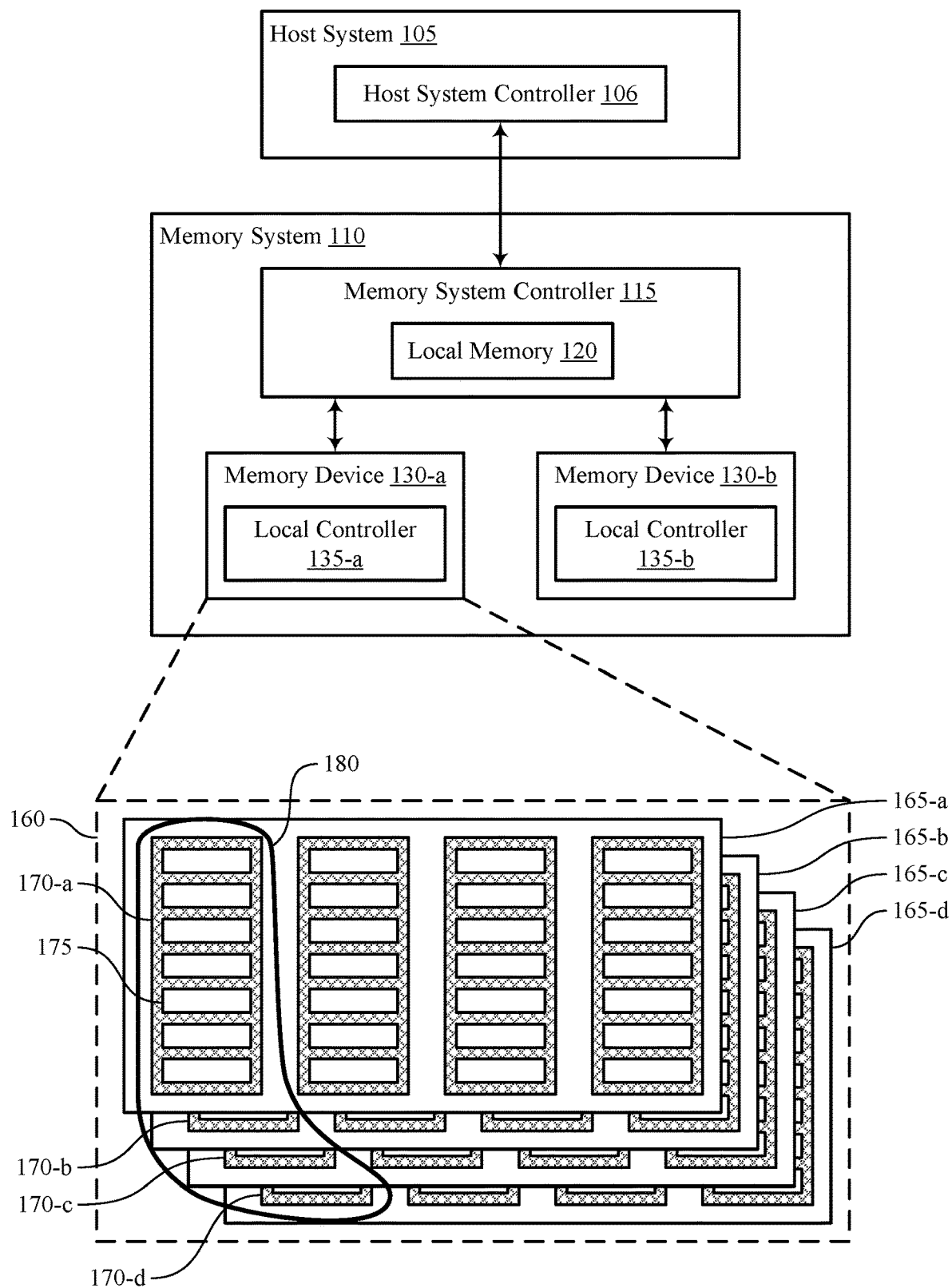
FIG. 1 illustrates an example of a system that supports performance tuning for a memory device in accordance with examples as disclosed herein.
Figure 2:
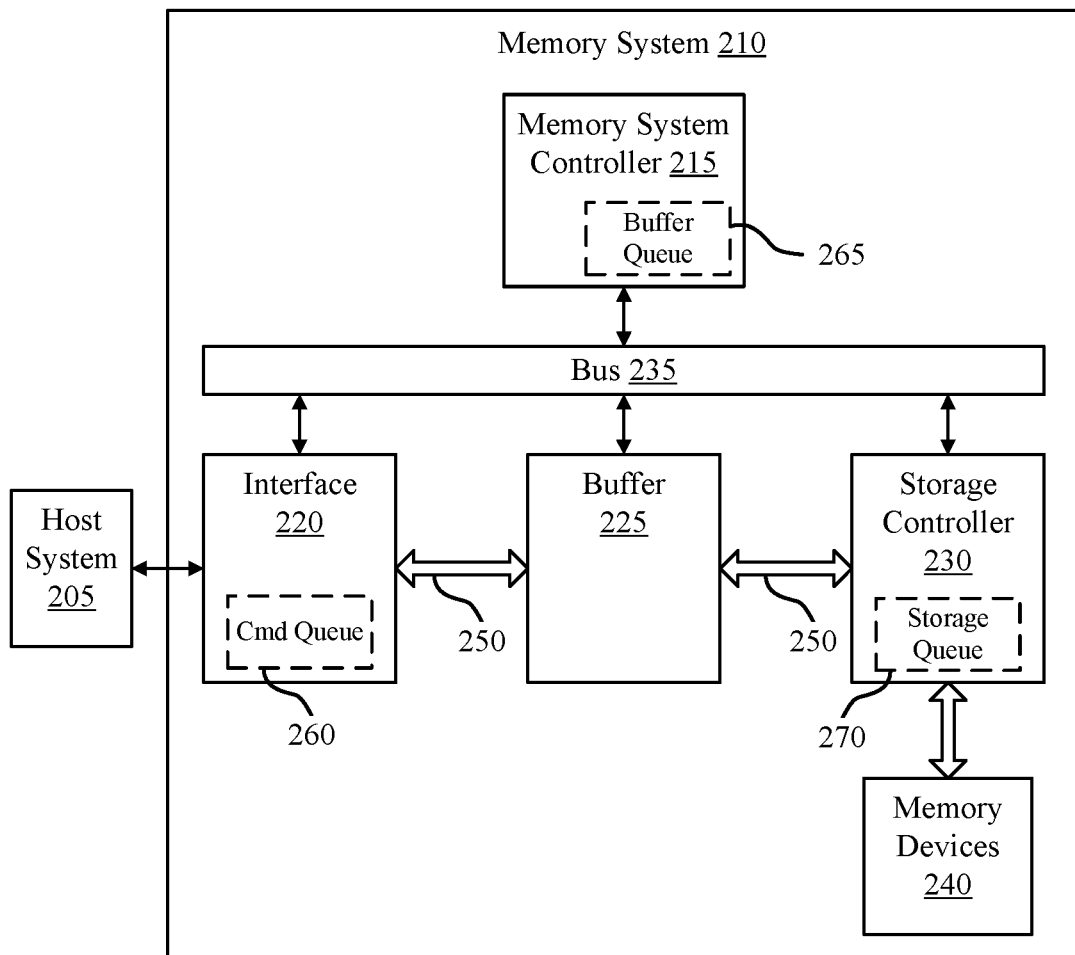
FIG. 2 illustrates an example of a system that supports performance tuning for a memory device in accordance with examples as disclosed herein.

Features of the disclosure are initially described in the context of systems with reference to FIGS. 1 and 2. Features of the disclosure are described in the context of process flow diagrams with reference to FIGS. 3 and 4. These and other features of the disclosure are further illustrated by and described in the context of apparatus diagrams and flowcharts that relate to performance tuning for a memory device with reference to FIGS. 5-8.

FIG. 1 illustrates an example of a system 100 that supports performance tuning for a memory device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130.

A page 175 that includes no data may be a page 175 that has never been written to or that has been erased.

The system 100 may include any quantity of non-transitory computer readable media that support performance tuning for a memory device. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system controller 115 (e.g., a portion of the memory system controller 115, an interface of the memory system controller 115) may be configured to receive a command from the host system 105. The command may include an indicator that instructs the memory system controller 115 to suppress one or more portions of the command. For example, the indicator may be a first value, which may instruct the memory system controller 115 to suppress aspects of the command related to determining a physical address of the memory device 130 associated with the command and executing the command (e.g., reading data associated with the command or writing data associated with the command). In other examples, the indicator may be a second value, which may instruct the memory system controller to suppress aspects of the command related to execution.

Upon suppressing aspects of the command, the memory system controller 115 may generate a response for outputting (e.g., transmitting) to the host system 105. In the event that the command is a read command, the memory system controller 115 may generate filler data (e.g., data not read from a physical address of the memory device 130 corresponding to the read command) to output with the response. The memory system controller 115 may output the response (including the filler data in the event of receiving a read command), which may indicate to the host system 105 that the command was executed.

By partially executing the command (e.g., the read command or the write command), the host system 105 may discern performance issues related to operations performed by the aspects of the memory system controller 115. Accordingly, the host system 105 may tune the performance of the memory system 110, which may improve the overall performance of the memory system 110.

FIG. 2 illustrates an example of a system 200 that supports performance tuning for a memory device in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system controller 215 (e.g., a portion of the memory system controller 215, an interface of the memory system controller 215) may be configured to receive a command from the host system 205. The command may include an indicator that instructs the memory system controller 215 to suppress one or more portions of the command. For example, the indicator may be a first value, which may instruct the memory system controller 215 to suppress aspects of the command related to determining a physical address of the memory devices 240 associated with the command and executing the command (e.g., reading data associated with the command or writing data associated with the command). In other examples, the indicator may be a second value, which may instruct the memory system controller to suppress aspects of the command related to execution.

Upon suppressing aspects of the command, the memory system controller 215 may generate a response for outputting (e.g., transmitting) to the host system 205. In the event that the command is a read command, the memory system controller 215 may generate filler data (e.g., data not read from a physical address of the memory devices 240 corresponding to the read command) to output with the response. The memory system controller 215 may output the response (including the filler data in the event of receiving a read command), which may indicate to the host system 205 that the command was executed.

By partially executing the command (e.g., the read command or the write command), the host system 205 may discern performance issues related to operations performed by the aspects of the memory system controller 215. Accordingly, the host system 205 may tune the performance of the memory system 210, which may improve the overall performance of the memory system 210.

Figure 3:
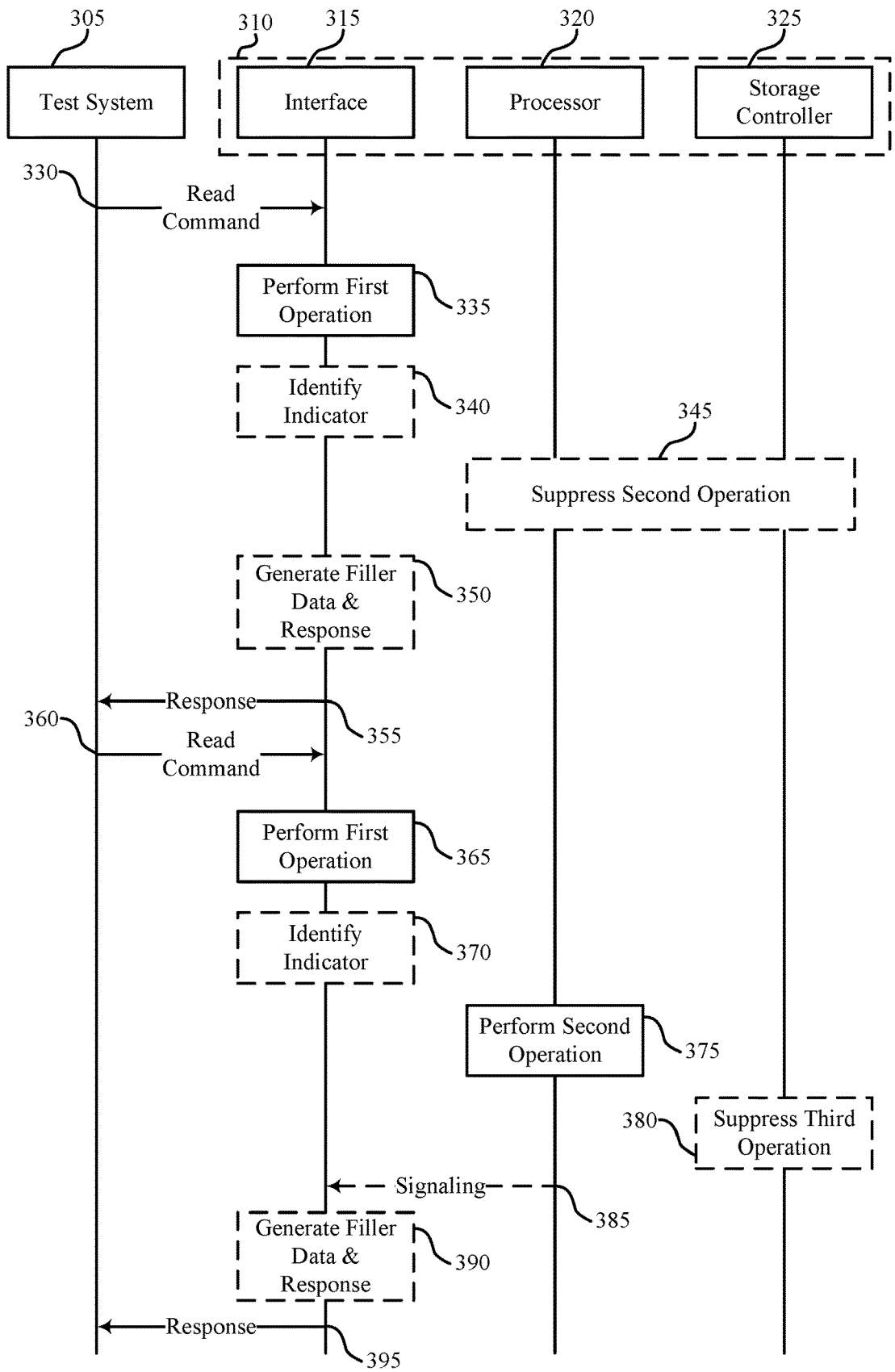
FIG. 3 illustrates an example of a process flow diagram that supports performance tuning for a memory device in accordance with examples as disclosed herein.

FIG. 3 illustrates an example of a process flow diagram 300 that supports performance tuning for a memory device in accordance with examples as disclosed herein. The process flow diagram 300 may illustrate operations performed at a test system 305 and a memory system 310. In some instances, the memory system 310 may include an interface 315, a processor 320, and a storage controller 325. The interface 315 may include or may be associated with a command queue (e.g., a first command queue, not shown). The interface 315 may be an example of the interface 220 of FIG. 2. The storage controller 325 may be associated with a command queue (e.g., a second command queue, not shown). The storage controller 325 may be an example of the storage controller 230 of FIG. 2. Processor 320 may be an example of the memory system controller 215 of FIG. 2. Moreover, the test system 305 may be an example of a host system (e.g., a host system 105 as described with reference to FIG. 1) that is configured to transmit read commands to the memory system 310. As described herein, the read commands transmitted from the test system 305 to the memory system 310 may include an indicator that instructs the memory system to execute the command or to partially execute the command. By partially executing a read command, the test system 305 may discern performance issues related to operations performed by the interface 315, the processor 320, or the storage controller 325. Accordingly, the test system 305 may tune the performance of the memory system 310, which may improve the overall performance of the memory system 310.

As described herein, the test system 305 may be an example of a host system (e.g., a host system 105 as described with reference to FIG. 1) that is configured to transmit read commands to the memory system 310. In some instances, the read commands may be formatted as or consist of packets called UFS Protocol Information Units (UPIUs). The UPIUs may include one or more fields (e.g., reserved fields) for an indicator. For example, the field may include an indicator having one of a plurality of values. In some examples, a first value may instruct the memory system 310 to suppress operations performed by the processor 320 and the storage controller 325, a second value may instruct the memory system 310 to suppress operations performed by the storage controller 325, and a third value may instruct the memory system 310 to not suppress any operations (e.g., to execute the read command).

In other examples, the test system 305 may transmit an indicator using a specific command, a different command protocol, or by using specific pins (e.g., a specific subset of pins). In any of these instances, a value of the indicator may instruct the memory system 310 to suppress operations performed by the processor 320 and the storage controller 325, the storage controller 325, or to not suppress any operations (e.g., to execute the read command). By suppressing particular operations related to a read command, the test system 305 may discern performance issues related to the memory system 310 and may tune aspects of the memory system 310 to improve its overall performance.

The interface 315 may be an example of a front-end of a memory system 310. In some examples, the interface 315 may receive commands from the test system 305 and may generate an internal command for the processor 320. For example, the interface 315 may generate an internal command that instructs the processor 320 to perform a read operation (or a portion of a read operation) at a logical address of the memory system 310. In some instances, upon generating the internal command, the interface 315 may store the command to a command queue (e.g., a first command queue, not shown) that is associated with the interface 315.

In other examples, portions of the read operation otherwise performed by the processor 320 and the storage controller 325 may be suppressed, thus the interface 315 may generate a response indicating a completion of the read command by the memory system 310. In such instances, the interface 315 may generate filler data and may output the response and filler data to the test system 305. As used herein, filler data may refer to data generated by the interface 315 (or another component of the memory system 310) or that is otherwise not read from memory cells corresponding to a logical address of the received read command. Accordingly, the filler data may be used to satisfy the received read command, which may allow for the test system 305 to discern performance issues related to the memory system 310 and tune aspects of the memory system 310 to improve its overall performance.

The processor 320 may be an example of an FTL of a memory system 310. In some examples, the processor 320 may retrieve commands (e.g., internal commands) from the command queue associated with the interface 315. As described herein, the internal commands may be associated with a logical address of the memory system 310, and thus the processor 320 may determine a physical address of the memory system 310 based on the logical address. In some instances, the processor 320 may then communicate the read command and the physical address to the storage controller 325 (or the storage controller 325 may retrieve the read command and the physical address from the processor 320).

In other examples, portions of the read operation otherwise performed by the storage controller 325 may be suppressed and thus the processor 320 may transmit signaling to the interface 315 indicating that it has performed a respective portion of the read command. In such instances, as described above, the interface 315 may generate a response and filler data for outputting to the test system 305.

The storage controller 325 may be an example of a backend of a memory system 310. In some examples, the storage controller 325 may retrieve commands (e.g., internal commands including a physical address of the memory system 310) from the processor 320. For example, the storage controller 325 may retrieve the command from the processor 320 and may store the command to a command queue (e.g., a second command queue, not shown) that is associated with the storage controller 325. Upon storing the command to the command queue, the storage controller 325 may access a portion of the memory system 310 corresponding to the physical address. In such instances, after reading data from the physical address, the data may be transmitted to the processor 320 and the processor 320 may transmit the data to the interface 315 for outputting to the test system 305. In some instances, however, it may be less desirable to perform an entire read operation during a testing operation as the test system 305 may be unable to discern where performance issues occur within the memory system 310. In other words, suppressing portions of a read command may be desirable so that the test system 305 can determine whether any performance issues occur at a specific portion of the memory system 310 (e.g., at the interface 315, the processor 320, or the storage controller 325).

At 330, the test system 305 may transmit a read command to the memory system 310. The read command may be received by the interface 315. As described herein, the read command may include an indicator that instructs the memory system 310 to perform the command or to suppress one or more operations associated with the read command. For exemplary purposes only, the read command transmitted at 330 may include a first value, which may instruct the memory system 310 to suppress operations performed by the processor 320 and by the storage controller 325.

At 335, the interface 315 may perform a first operation associated with the read command. In some instances, the first operation may include generating an internal command (e.g., an entry) for the processor 320. The first operation may also include the interface 315 storing the entry to a command queue (e.g., a first queue, not shown) for which the processor 320 is operable to retrieve the entry from. In some instances, the entry may include a logical address associated with the read command such that, if the processor 320 retrieves the entry, the processor 320 can determine a physical address of the memory system 310 to perform the read operation on.

At 340, the interface 315 may identify a value of the indicator included in the read command. Alternatively, in some examples, the interface 315 may identify the value of the indicator before performing the first operation (e.g., at 335). As described herein, for exemplary purposes only, the read command received from the test system 305 (e.g., at 330) may indicate a first value, which may instruct the memory system 310 to suppress operations performed by the processor 320 and by the storage controller 325. Suppressing operations performed by both the processor 320 and the storage controller 325 may be referred to herein as suppressing a second operation associated with the read command.

At 345, the processor 320 and the storage controller 325 may suppress the second operation associated with the read command. In some examples, the processor 320 and the storage controller 325 may be instructed to refrain from performing the second operation based on signaling transmitted from the interface 315 (not shown) or due to an absence of signaling transmitted from the interface 315. For example, the interface 315 may ordinarily generate signaling that instructs the processor 320 to retrieve the entry from the command queue. Thus, by refraining from transmitting such signaling the processor 320 and, in turn, the storage controller 325 may refrain from performing the second operation. In other examples, the interface 315 may actively generate signaling (not shown) that instructs the processor 320 to refrain from retrieving the entry from the command queue which, in turn, may result in the processor 320 and storage controller 325 refraining from performing the second operation. The storage controller 325 refraining from performing the second operation may also suppress a third operation of the storage controller that is dependent on the second operation.

At 350, the interface 315 may generate filler data and a response for transmitting to the test system 305. The response and filler data may indicate completion of the read command, despite the second operation being suppressed. By transmitting the response with the filler data, the read command (e.g., transmitted at 330) may be satisfied despite the data not being read from the physical address of the memory system 310 corresponding to the read command. At 355, the interface 315 may transmit (e.g., output) the response to the test system 305.

In some instances (not shown), the test system 305 may tune one or more performance metrics of the memory system 330 based on receiving the response (e.g., at 355). For example, if the read operation corresponding to the read command encounters any errors, the test system 305 may be able to discern that the error occurred at the interface 315 due to operations performed by the processor 320 and the storage controller 325 being suppressed. Additionally or alternatively, the test system 305 may be able to debug errors related to timing parameters of the memory system 310 (or the interface 315, specifically) by determining the duration elapsed between transmitting the read command (e.g., at 330) and receiving the response (e.g., at 355). Accordingly, the test system 305 may tune the performance of the memory system 310, which may improve its overall performance.

In another example, at 360, the test system 305 may transmit a read command (e.g., a second read command) to the memory system 310. The second read command may be received by the interface 315. As described herein, the read command may include an indicator that instructs the memory system 310 to perform the command or to suppress one or more operations associated with the read command. For exemplary purposes only, the second read command transmitted at 330 may include a second value, which may instruct the memory system 310 to suppress operations performed by the storage controller 325.

At 365, the interface 315 may perform a first operation associated with the second read command. In some instances, the first operation may include generating an internal command (e.g., an entry) for the processor 320. The first operation may also include the interface 315 storing the entry to a command queue (e.g., a first queue, not shown) for which the processor 320 is operable to retrieve the entry from. In some instances, the entry may include a logical address associated with the second read command such that, if the processor 320 retrieves the entry, the processor 320 can determine a physical address of the memory system 310 to perform the read operation on.

At 370, the interface 315 may identify a value of the indicator included in the second read command. Alternatively, in some examples, the interface 315 may identify the value of the indicator before performing the first operation (e.g., at 365). As described herein, for exemplary purposes only, the second read command received from the test system 305 (e.g., at 330) may indicate a second value, which may instruct the memory system 310 to suppress operations performed by the storage controller 325. Suppressing operations performed by the storage controller 325 may be referred to herein as suppressing a third operation associated with the second read command.

At 375, the processor 320 may perform a second operation associated with the second read command. The processor 320 may perform the second operation by retrieving the entry from the storage queue of the interface 315 and determining a physical address of the memory system 310 that is associated with the second read command. In some examples, the processor 320 may determine the physical address of the memory system 310 by utilizing a lookup table stored to a memory array of the memory system 310 (not shown), or by utilizing a portion of the lookup table stored to memory associated with the processor 320 (not shown).

At 380, the storage controller 325 may suppress the third operation associated with the second read command. In some examples, the storage controller 325 may be instructed to refrain from performing the third operation based on signaling transmitted from the processor 320 (not shown) or due to an absence of signaling transmitted from the processor 320. For example, the processor 320 may ordinarily generate signaling that communicates the entry (including the physical address) to the storage controller 325. Thus, by refraining from transmitting such signaling, the storage controller 325 may refrain from performing the third operation. In other examples, the processor 320 may actively generate signaling (not shown) that instructs the storage controller 325 to refrain from storing the entry to a storage queue (e.g., a second storage queue, not shown).

At 385, the processor 320 may transmit signaling to the interface 315 that indicates the completion of the second operation. At 390, the interface 315 may generate filler data and a response for transmitting to the test system 305. The response and filler data may indicate completion of the second read command, despite the third operation being suppressed. By transmitting the response with the filler data, the second read command (e.g., transmitted at 360) may be satisfied despite the data not being read from the physical address of the memory system 310 corresponding to the second read command. At 395, the interface 315 may transmit (e.g., output) the response to the test system 305.

In some instances (not shown), the test system 305 may tune one or more performance metrics of the memory system 330 based on receiving the response (e.g., at 395). For example, if the read operation corresponding to the second read command encounters any errors, the test system 305 may be able to discern that the error occurred at the interface 315 or the processor 320 due to operations performed by the storage controller 325 being suppressed. Additionally or alternatively, the test system 305 may be able to debug errors related to timing parameters of the memory system 310 by determining the duration elapsed between transmitting the read command (e.g., at 360) and receiving the response (e.g., at 395). Accordingly, the test system 305 may tune the performance of the memory system 310, which may improve its overall performance.

Figure 4:
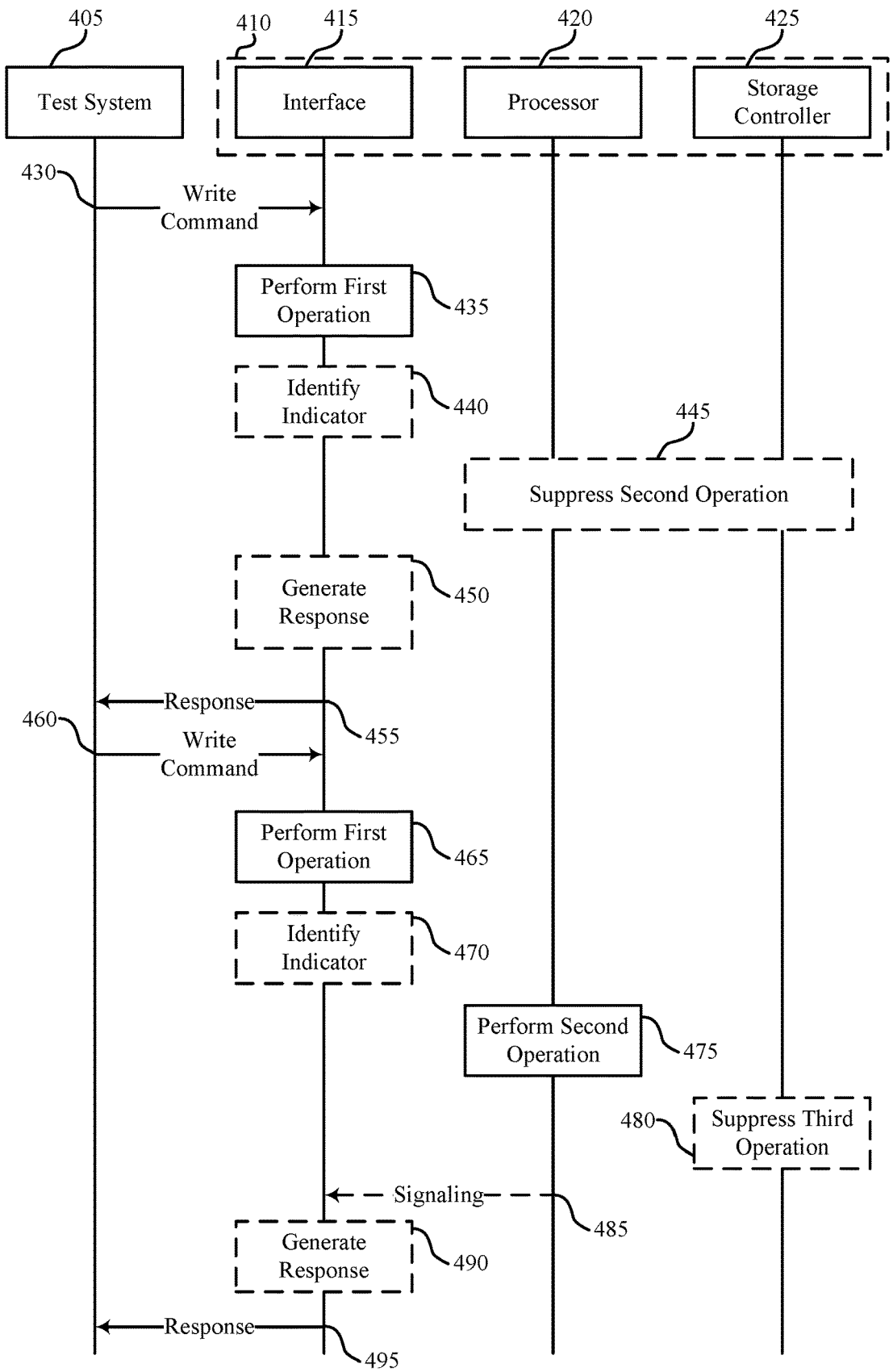
FIG. 4 illustrates an example of a process flow diagram that supports performance tuning for a memory device in accordance with examples as disclosed herein.

FIG. 4 illustrates an example of a process flow diagram 400 that supports performance tuning for a memory device in accordance with examples as disclosed herein. The process flow diagram 400 may illustrate operations performed at a test system 405 and a memory system 410. In some instances, the memory system 410 may include an interface 415, a processor 420, and a storage controller 425. The interface 415 may include or may be associated with a command queue (e.g., a first command queue, not shown) The interface 415 may be an example of the interface 220 of FIG. 2. The storage controller 425 may be associated with a command queue (e.g., a second command queue, not shown). The storage controller 425 may be an example of the storage controller 230 of FIG. 2. Processor 420 may be an example of the memory system controller 215 of FIG. 2. Moreover, the test system 405 may be an example of a host system (e.g., a host system 105 as described with reference to FIG. 1) that is configured to transmit write commands to the memory system 410. As described herein, the write commands transmitted from the test system 405 to the memory system 410 may include an indicator that instructs the memory system to execute the command or to partially execute the command. By partially executing a write command, the test system 405 may discern performance issues related to operations performed by the interface 415, the processor 420, or the storage controller 425. Accordingly, the test system 405 may tune the performance of the memory system 410, which may improve the overall performance of the memory system 410.

As described herein, the test system 405 may be an example of a host system (e.g., a host system 105 as described with reference to FIG. 1) that is configured to transmit write commands to the memory system 410. In some instances, the write commands may be formatted as or consist of packets called UPIUs. The UPIUs may include one or more fields (e.g., reserved fields) for an indicator. For example, the field may include an indicator having one of a plurality of values. In some examples, a first value may instruct the memory system 410 to suppress operations performed by the processor 420 and the storage controller 425, a second value may instruct the memory system 410 to suppress operations performed by the storage controller 425, and a third value may instruct the memory system 410 to not suppress any operations (e.g., to execute the write command).

In other examples, the test system 405 may transmit an indicator using a specific command, a different command protocol, or by using specific pins (e.g., a specific subset of pins). In any of these instances, a value of the indicator may instruct the memory system 410 to suppress operations performed by the processor 420 and the storage controller 425, the storage controller 425, or to not suppress any operations (e.g., to execute the write command). By suppressing particular operations related to a write command, the test system 405 discern performance issues related to the memory system 410 and may tune aspects of the memory system 410 to improve its overall performance.

The interface 415 may be an example of a frontend of a memory system 410. In some examples, the interface 415 may receive commands from the test system 405 and may generate an internal command for the processor 420. For example, the interface 415 may generate an internal command that instructs the processor 420 to perform a write operation (or a portion of a write operation) at a logical address of the memory system 410. In some instances, upon generating the internal command, the interface 415 may store the command to a command queue (e.g., a first command queue, not shown) that is associated with the interface 415.

In other examples, portions of the write operation otherwise performed by the processor 420 and the storage controller 425 may be suppressed, thus the interface 415 may generate a response indicating a completion of the write command by the memory system 410. In such instances, data included in the write command may not be written to the memory system 410.

The processor 420 may be an example of a FTL of a memory system 410. In some examples, the processor 420 may retrieve commands (e.g., internal commands) from the command queue associated with the interface 415. As described herein, the internal commands may be associated with a logical address of the memory system 410, and thus the processor 420 may determine a physical address of the memory system 410 based on the logical address. In some instances, the processor 420 may then communicate the write command and the physical address to the storage controller 425 (or the storage controller 425 may retrieve the write command and the physical address from the processor 420).

In other examples, portions of the write operation otherwise performed by the storage controller 425 may be suppressed and thus the processor 420 may transmit signaling to the interface 415 indicating that it has performed a respective portion of the write command. In such instances, as described above, the interface 415 may generate a response for outputting to the test system 405 and the data associated with the write command may not be written to the memory system 410.

The storage controller 425 may be an example of a backend of a memory system 410. In some examples, the storage controller 425 may retrieve commands (e.g., internal commands including a physical address of the memory system 410) from the processor 420. For example, the storage controller 425 may retrieve the command from the processor 420 and may store the command to a command queue (e.g., a second command queue, not shown) that is associated with the storage controller 425. Upon storing the command to the command queue, the storage controller 425 may write data to a portion of the memory system 410 corresponding to the physical address. In such instances, after writing the data to the physical address, signaling indicating a completion of the write operation may be transmitted to the processor 420 and the processor 420 may transmit the indication to the interface 415. The interface 415 may then output a response to the test system 405. In some instances, however, it may be less desirable to perform an entire write operation during a testing operation as the test system 405 may be unable to discern where performance issues occur within the memory system 410. In other words, suppressing portions of a write command may be desirable so that the test system 405 can determine whether any performance issues occur at a specific portion of the memory system 410 (e.g., at the interface 415, the processor 420, or the storage controller 425).

At 430, the test system 405 may transmit a write command to the memory system 410. The write command may be received by the interface 415. As described herein, the write command may include an indicator that instructs the memory system 410 to perform the command or to suppress one or more operations associated with the write command. For exemplary purposes only, the write command transmitted at 430 may include a first value, which may instruct the memory system 410 to suppress operations performed by the processor 420 and by the storage controller 425.

At 435, the interface 415 may perform a first operation associated with the write command. In some instances, the first operation may include generating an internal command (e.g., an entry) for the processor 420. The first operation may also include the interface 415 storing the entry to a command queue (e.g., a first queue, not shown) for which the processor 420 is operable to retrieve the entry from. In some instances, the entry may include a logical address associated with the write command such that, if the processor 420 retrieves the entry, the processor 420 can determine a physical address of the memory system 410 to write the associated data to.

At 440, the interface 415 may identify a value of the indicator included in the write command. Alternatively, in some examples, the interface 415 may identify the value of the indicator before performing the first operation (e.g., at 435). As described herein, for exemplary purposes only, the write command received from the test system 405 (e.g., at 430) may indicate a first value, which may instruct the memory system 410 to suppress operations performed by the processor 420 and by the storage controller 425. Suppressing operations performed by both the processor 420 and the storage controller 425 may be referred to herein as suppressing a second operation associated with the write command.

At 445, the processor 420 and the storage controller 425 may suppress the second operation associated with the write command. In some examples, the processor 420 and the storage controller 425 may be instructed to refrain from performing the second operation based on signaling transmitted from the interface 415 (not shown) or due to an absence of signaling transmitted from the interface 415. For example, the interface 415 may ordinarily generate signaling that instructs the processor 420 to retrieve the entry from the command queue. Thus, by refraining from transmitting such signaling the processor 420 and, in turn, the storage controller 425 may refrain from performing the second operation. In other examples, the interface 415 may actively generate signaling (not shown) that instructs the processor 420 to refrain from retrieving the entry from the command queue which, in turn, may result in the processor 420 and storage controller 425 refraining from performing the second operation. The storage controller 425 refraining from performing the second operation may also suppress a third operation of the storage controller that is dependent on the second operation.

At 450, the interface 415 may generate a response for transmitting to the test system 405. The response may indicate completion of the write command, despite the second operation being suppressed. By transmitting the response to the test system 405, the test system 405 may assume that the write operation was completed despite the data not being written to the physical address of the memory system 410 corresponding to the write command. At 455, the interface 415 may transmit (e.g., output) the response to the test system 405.

In some instances (not shown), the test system 405 may tune one or more performance metrics of the memory system 440 based on receiving the response (e.g., at 455). For example, if the write operation corresponding to the write command encounters any errors, the test system 405 may be able to discern that the error occurred at the interface 415 due to operations performed by the processor 420 and the storage controller 425 being suppressed. Additionally or alternatively, the test system 405 may be able to debug errors related to timing parameters of the memory system 410 (or the interface 415, specifically) by determining the duration elapsed between transmitting the write command (e.g., at 430) and receiving the response (e.g., at 455). Accordingly, the test system 405 may tune the performance of the memory system 410, which may improve its overall performance.

In another example, at 460, the test system 405 may transmit a write command (e.g., a second write command) to the memory system 410. The second write command may be received by the interface 415. As described herein, the write command may include an indicator that instructs the memory system 410 to perform the command or to suppress one or more operations associated with the write command. For exemplary purposes only, the second write command transmitted at 440 may include a second value, which may instruct the memory system 410 to suppress operations performed by the storage controller 425.

At 465, the interface 415 may perform a first operation associated with the second write command. In some instances, the first operation may include generating an internal command (e.g., an entry) for the processor 420. The first operation may also include the interface 415 storing the entry to a command queue (e.g., a first queue, not shown) for which the processor 420 is operable to retrieve the entry from. In some instances, the entry may include a logical address associated with the second write command such that, if the processor 420 retrieves the entry, the processor 420 can determine a physical address of the memory system 410 to perform the write operation on.

At 470, the interface 415 may identify a value of the indicator included in the second write command. Alternatively, in some examples, the interface 415 may identify the value of the indicator before performing the first operation (e.g., at 465). As described herein, for exemplary purposes only, the second write command received from the test system 405 (e.g., at 440) may indicate a second value, which may instruct the memory system 410 to suppress operations performed by the storage controller 425. Suppressing operations performed by the storage controller 425 may be referred to herein as suppressing a third operation associated with the second write command.

At 475, the processor 420 may perform a second operation associated with the second write command. In some examples, the processor 420 may perform the second operation by retrieving the entry from the storage queue of the interface 415 and determining a physical address of the memory system 410 that is associated with the second write command. In some examples, the processor 420 may determine the physical address of the memory system 410 by utilizing a lookup table stored to a memory array of the memory system 410 (not shown), or by utilizing a portion of the lookup table stored to memory associated with the processor 420 (not shown).

At 480, the storage controller 425 may suppress the third operation associated with the second write command. In some examples, the storage controller 425 may be instructed to refrain from performing the third operation based on signaling transmitted from the processor 420 (not shown) or due to an absence of signaling transmitted from the processor 420. For example, the processor 420 may ordinarily generate signaling that communicates the entry (including the physical address) to the storage controller 425. Thus, by refraining from transmitting such signaling, the storage controller 425 may refrain from performing the third operation. In other examples, the processor 420 may actively generate signaling (not shown) that instructs the storage controller 425 to refrain from storing the entry to a storage queue (e.g., a second storage queue, not shown).

At 485, the processor 420 may transmit signaling to the interface 415 that indicates the completion of the second operation. At 490, the interface 415 may generate a response for transmitting to the test system 405. The response may indicate completion of the second write command, despite the third operation being suppressed. By transmitting the response to the test system 405, the test system 405 may assume that the second write operation was completed despite the data not being written to the physical address of the memory system 410 corresponding to the second write command. At 495, the interface 415 may transmit (e.g., output) the response to the test system 405.

In some instances (not shown), the test system 405 may tune one or more performance metrics of the memory system 440 based on receiving the response (e.g., at 495). For example, if the write operation corresponding to the second write command encounters any errors, the test system 405 may be able to discern that the error occurred at the interface 415 or the processor 420 due to operations performed by the storage controller 425 being suppressed. Additionally or alternatively, the test system 405 may be able to debug errors related to timing parameters of the memory system 410 by determining the duration elapsed between transmitting the write command (e.g., at 460) and receiving the response (e.g., at 495). Accordingly, the test system 405 may tune the performance of the memory system 410, which may improve its overall performance.

Figure 5:
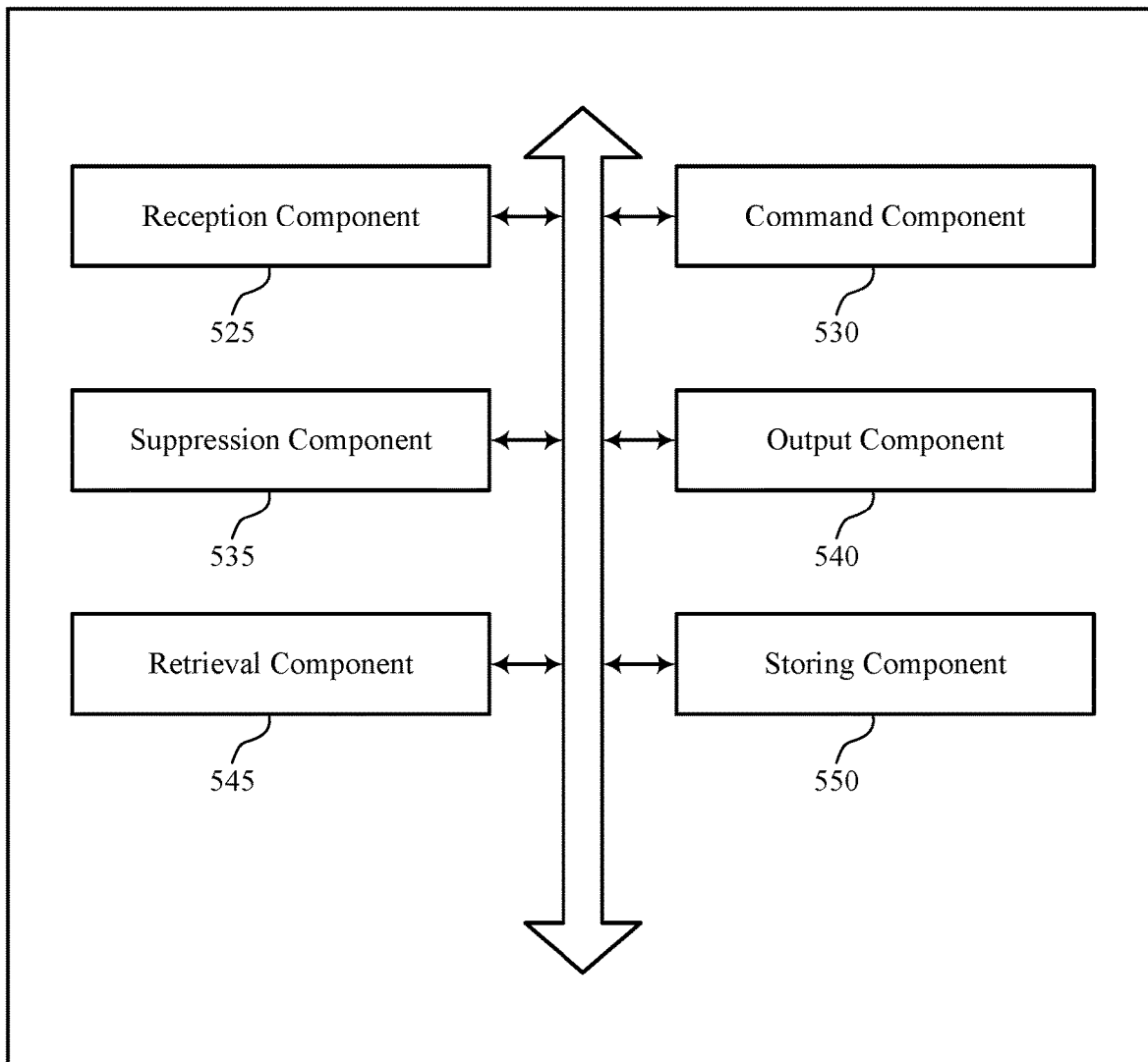
FIG. 5 shows a block diagram of a memory controller 1 that supports performance tuning for a memory device in accordance with examples as disclosed herein.

FIG. 5 shows a block diagram 500 of a memory controller 520 that supports performance tuning for a memory device in accordance with examples as disclosed herein. The memory controller 520 may be an example of aspects of a memory controller as described with reference to FIGS. 1 through 4. The memory controller 520, or various components thereof, may be an example of means for performing various aspects of performance tuning for a memory device as described herein. For example, the memory controller 520 may include a reception component 525, a command component 530, a suppression component 535, an output component 540, a retrieval component 545, a storing component 550, or any combination thereof. Each of these components may communicate, directly or indirectly, with one another (e.g., via one or more buses).

The reception component 525 may be configured as or otherwise support a means for receiving a read command at an interface of a memory system that includes a processor and a storage controller, where the read command includes an indicator of partial execution of the read command.

The command component 530 may be configured as or otherwise support a means for performing, by the interface, a first operation associated with the read command based at least in part on receiving the read command, the first operation including generating, for a command queue for the processor, an entry associated with the read command based on one or more parameters of the read command.

In some examples, the indicator includes a second value, and the command component 530 may be configured as or otherwise support a means for performing, by the processor, a second operation associated with the read command based at least in part on retrieving the entry from the command queue.

The suppression component 535 may be configured as or otherwise support a means for suppressing one or more additional operations associated with the read command based at least in part on the interface performing the first operation and on the indicator of partial execution of the read command, where the one or more additional operations associated with the read command are suppressed by the processor, the storage controller, or both.

In some examples, the indicator includes a first value, and the suppression component 535 may be configured as or otherwise support a means for suppressing a second operation of the processor associated with the read command and a third operation of the storage controller associated with the read command based at least in part on the indicator including the first value, where outputting the response is based at least in part on the interface performing the first operation, the processor suppressing the second operation, and the storage controller suppressing the third operation.

In some examples, the indicator includes a second value, and the suppression component 535 may be configured as or otherwise support a means for suppressing, by the storage controller, a third operation associated with the read command based at least in part on the indicator including the second value, where outputting the response is based at least in part on the interface performing the first operation, the processor performing the second operation, and the storage controller suppressing the third operation.

The output component 540 may be configured as or otherwise support a means for outputting, by the interface, a response indicating completion of the read command by the memory system based at least in part on performing the first operation and suppressing the one or more additional operations, where the response includes filler data generated based at least in part on suppressing the one or more additional operations.

In some examples, the indicator includes a second value, and the retrieval component 545 may be configured as or otherwise support a means for retrieving, by the processor, the entry from the command queue based at least in part on the interface performing the first operation and the first value of the indicator.

In some examples, to support suppressing the third operation associated with the read command, the storing component 550 may be configured as or otherwise support a means for refraining from storing the entry associated with the read command to the second command queue.

In some examples, the second operation associated with the read command includes mapping a logical address associated with the read command to a physical address of the memory system. In some examples, the third operation associated with the read command includes reading data from one or more non-volatile memory cells associated with the physical address of the memory system.

Figure 6:
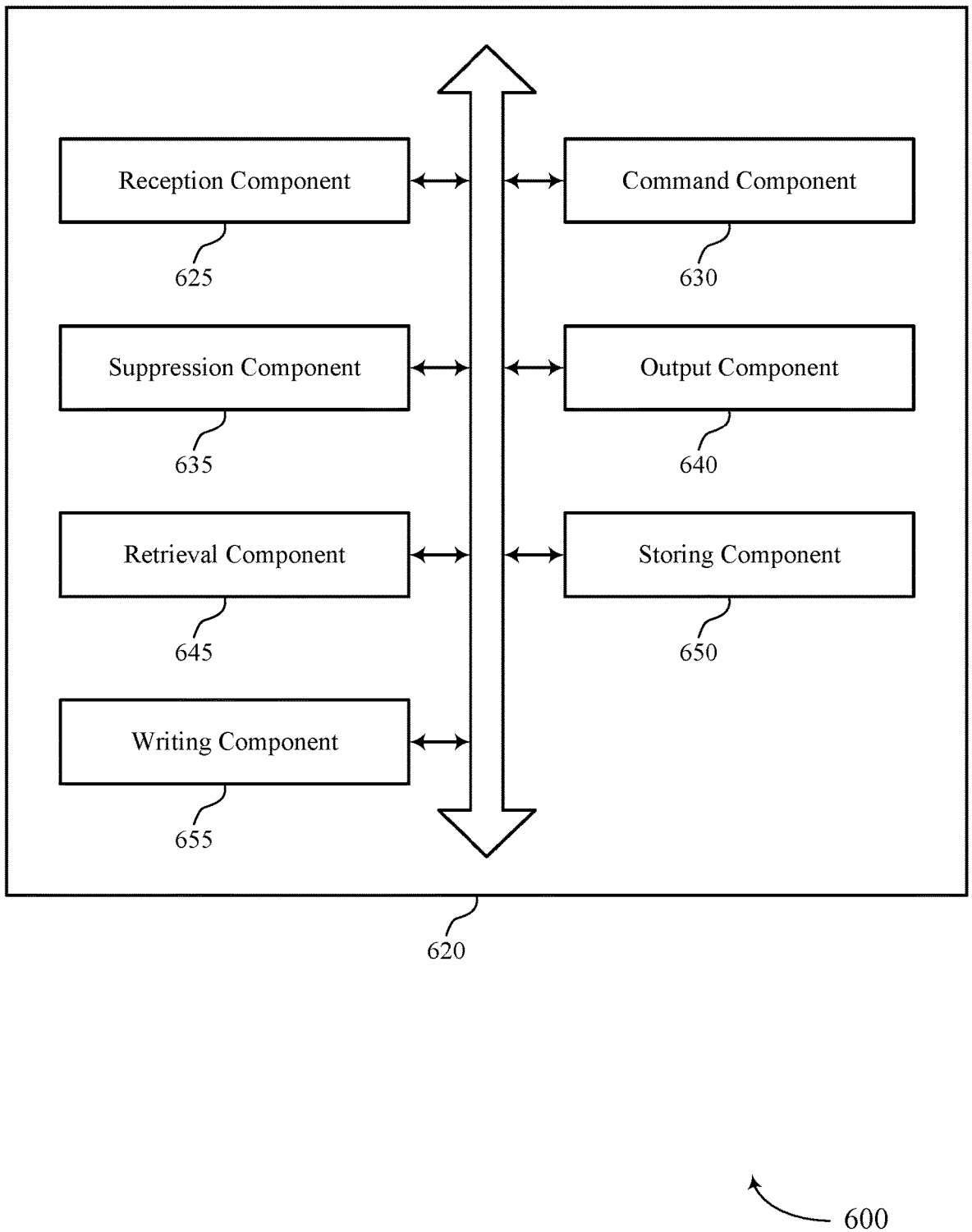
FIG. 6 shows a block diagram of a memory controller 2 that supports performance tuning for a memory device in accordance with examples as disclosed herein.

FIG. 6 shows a block diagram 600 of a memory controller 620 that supports performance tuning for a memory device in accordance with examples as disclosed herein. The memory controller 620 may be an example of aspects of a memory controller as described with reference to FIGS. 1 through 4. The memory controller 620, or various components thereof, may be an example of means for performing various aspects of performance tuning for a memory device as described herein. For example, the memory controller 620 may include a reception component 625, a command component 630, a suppression component 635, an output component 640, a retrieval component 645, a storing component 650, or any combination thereof. Each of these components may communicate, directly or indirectly, with one another (e.g., via one or more buses).

The reception component 625 may be configured as or otherwise support a means for receiving a write command at an interface of a memory system that includes a processor and a storage controller, where the write command includes an indicator of partial execution of the write command.

The command component 630 may be configured as or otherwise support a means for performing, by the interface, a first operation associated with the write command based at least in part on receiving the write command, the first operation including generating, for a command queue for the processor, an entry associated with the write command based on one or more parameters of the write command.

In some examples, the indicator includes a second value, and the command component 630 may be configured as or otherwise support a means for performing, by the processor, a second operation associated with the write command based at least in part on retrieving the entry from the command queue.

The suppression component 635 may be configured as or otherwise support a means for suppressing one or more additional operations associated with the write command based at least in part on the interface performing the first operation associated with the write command and on the indicator of partial execution of the write command, where the one or more additional operations associated with the write command are suppressed by the processor, the storage controller, or both.

In some examples, the indicator includes a first value, and the suppression component 635 may be configured as or otherwise support a means for suppressing a second operation of the processor associated with the read command and a third operation of the storage controller associated with the write command based at least in part on the indicator including the first value, where outputting the response is based at least in part on the interface performing the first operation, the processor suppressing the second operation, and the storage controller suppressing the third operation.

In some examples, the indicator includes a second value, and the suppression component 635 may be configured as or otherwise support a means for suppressing, by the storage controller, a third operation associated with the write command based at least in part on the indicator including the second value, where outputting the response is based at least in part on the interface performing the first operation, the processor performing the second operation, and the storage controller suppressing the third operation.

The output component 640 may be configured as or otherwise support a means for outputting, by the interface, a response indicating completion of the write command by the memory system based at least in part on performing the first operation and suppressing the one or more additional operations.

In some examples, the indicator includes a second value, and the retrieval component 645 may be configured as or otherwise support a means for retrieving, by the processor, the entry from the command queue based at least in part on the interface performing the first operation and the first value of the indicator.

In some examples, to support suppressing the third operation associated with the write command, the storing component 650 may be configured as or otherwise support a means for refraining from storing the entry associated with the write command to the second command queue.

In some examples, the second operation associated with the write command includes mapping a logical address associated with the write command to a physical address of the memory system.

In some examples, the writing component 655 may be configured as or otherwise support a means for refraining from writing the data associated with the write command to one or more memory cells of the memory system based at least in part on suppressing the third operation associated with the write command.

In some examples, the third operation associated with the write command includes writing data to one or more non-volatile memory cells associated with the physical address of the memory system.

Figure 7:
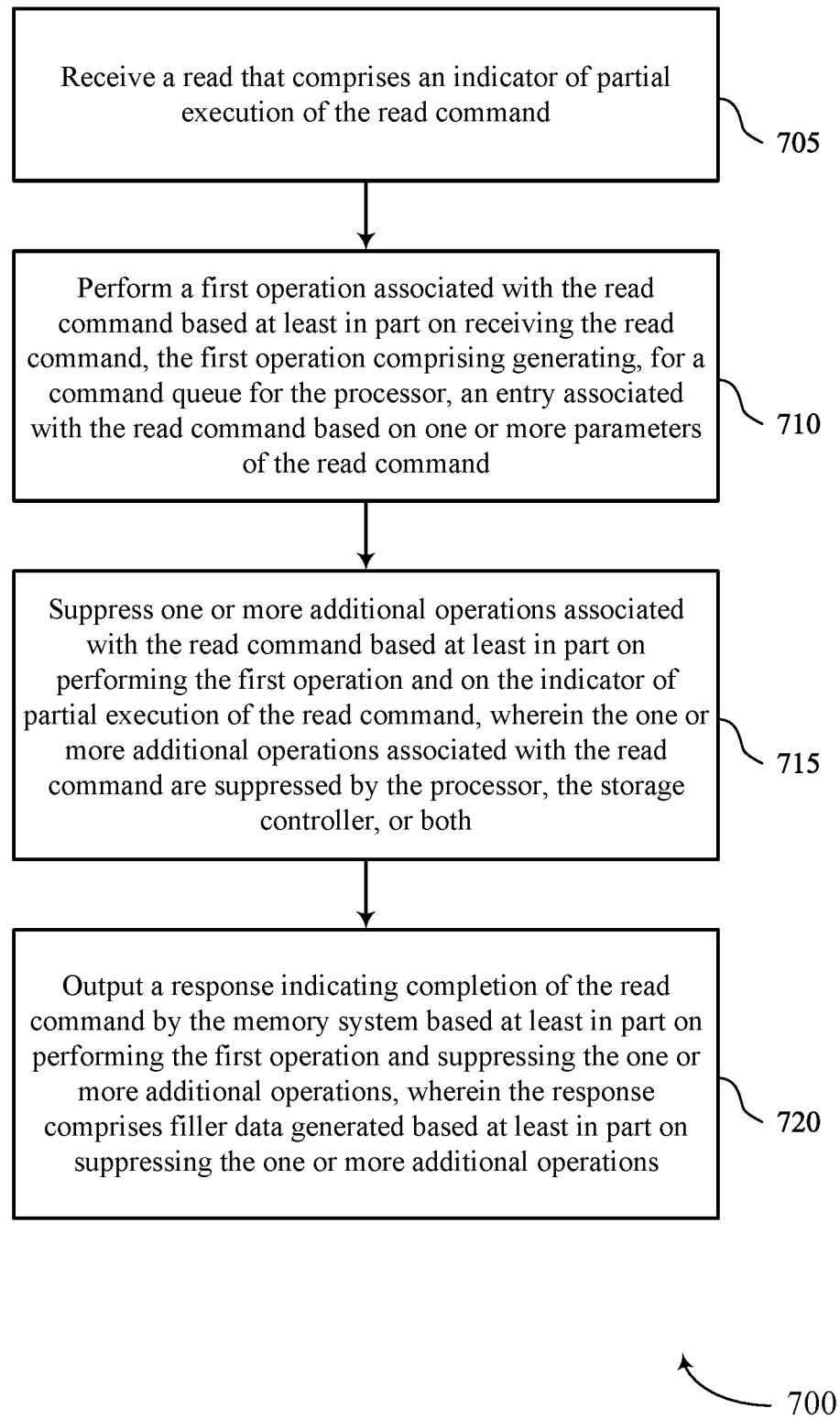
FIGS. 7 and 8 show flowcharts illustrating a method or methods that support performance tuning for a memory device in accordance with examples as disclosed herein.

FIG. 7 shows a flowchart illustrating a method 700 that supports performance tuning for a memory device in accordance with examples as disclosed herein. The operations of method 700 may be implemented by a memory controller or its components as described herein. For example, the operations of method 700 may be performed by a memory controller as described with reference to FIGS. 1 through 5. In some examples, a memory controller may execute a set of instructions to control the functional elements of the device to perform the described functions. Additionally or alternatively, the memory controller may perform aspects of the described functions using special-purpose hardware.

At 705, a read command that includes an indicator of partial execution of the read command may be received. For example, the read command may be received at an interface of a memory system that includes a processor and a storage controller. The operations of 705 may be performed in accordance with examples as disclosed herein. In some examples, aspects of the operations of 705 may be performed by a reception component 525 as described with reference to FIG. 5.

At 710, a first operation associated with the read command may be performed based at least in part on receiving the read command. The first operation may include generating an entry associated with the read command based on one or more parameters of the read command. For example, the first operation may be performed by the interface and the entry associated with the read command may be generated for a command queue for the processor. The operations of 710 may be performed in accordance with examples as disclosed herein. In some examples, aspects of the operations of 710 may be performed by a command component 530 as described with reference to FIG. 5.

At 715, one or more additional operations associated with the read command may be suppressed based at least in part on the first operation being performed and on the indication of partial execution of the read command. For example, the one or more additional operations associated with the read command may be suppressed based at least in part on the interface performing the first operation and on the indicator of partial execution of the read command, where the one or more additional operations associated with the read command are suppressed by the processor, the storage controller, or both. The operations of 715 may be performed in accordance with examples as disclosed herein. In some examples, aspects of the operations of 715 may be performed by a suppression component 535 as described with reference to FIG. 5.

At 720, a response indicating completion of the read command may be output based at least in part on performing the first operation and suppressing the one or more additional operations. The response may include filler data generated based at least in part on suppressing the one or more additional operations. For example, the interface may output the response indicating completion of the read command by the memory system based at least in part on performing the first operation and suppressing the one or more additional operations. The operations of 720 may be performed in accordance with examples as disclosed herein. In some examples, aspects of the operations of 720 may be performed by an output component 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving a read command at an interface of a memory system that includes a processor and a storage controller, where the read command includes an indicator of partial execution of the read command; performing, by the interface, a first operation associated with the read command based at least in part on receiving the read command, the first operation including generating, for a command queue for the processor, an entry associated with the read command based on one or more parameters of the read command; suppressing one or more additional operations associated with the read command based at least in part on the interface performing the first operation and on the indicator of partial execution of the read command, where the one or more additional operations associated with the read command are suppressed by the processor, the storage controller, or both; and outputting, by the interface, a response indicating completion of the read command by the memory system based at least in part on performing the first operation and suppressing the one or more additional operations, where the response includes filler data generated based at least in part on suppressing the one or more additional operations.

Aspect 2: The apparatus of aspect 1 where the indicator includes a first value and the method, apparatuses, and non-transitory computer-readable medium, further includes operations, features, circuitry, logic, means, or instructions, or any combination thereof for suppressing a second operation of the processor associated with the read command and a third operation of the storage controller associated with the read command based at least in part on the indicator including the first value, where outputting the response is based at least in part on the interface performing the first operation, the processor suppressing the second operation, and the storage controller suppressing the third operation.

Aspect 3: The apparatus of any of aspects 1 through 2 where the indicator includes a second value and the method, apparatuses, and non-transitory computer-readable medium, further includes operations, features, circuitry, logic, means, or instructions, or any combination thereof for retrieving, by the processor, the entry from the command queue based at least in part on the interface performing the first operation and the first value of the indicator; performing, by the processor, a second operation associated with the read command based at least in part on retrieving the entry from the command queue; and suppressing, by the storage controller, a third operation associated with the read command based at least in part on the indicator including the second value, where outputting the response is based at least in part on the interface performing the first operation, the processor performing the second operation, and the storage controller suppressing the third operation.

Aspect 4: The apparatus of aspect 3 where suppressing the third operation associated with the read command, further includes operations, features, circuitry, logic, means, or instructions, or any combination thereof for refraining from storing the entry associated with the read command to the second command queue.

Aspect 5: The apparatus of any of aspects 3 through 4, further including operations, features, circuitry, logic, means, or instructions, or any combination thereof for the second operation associated with the read command includes mapping a logical address associated with the read command to a physical address of the memory system.

Aspect 6: The apparatus of any of aspects 3 through 5, further including operations, features, circuitry, logic, means, or instructions, or any combination thereof for the third operation associated with the read command includes reading data from one or more non-volatile memory cells associated with the physical address of the memory system.

Figure 8:
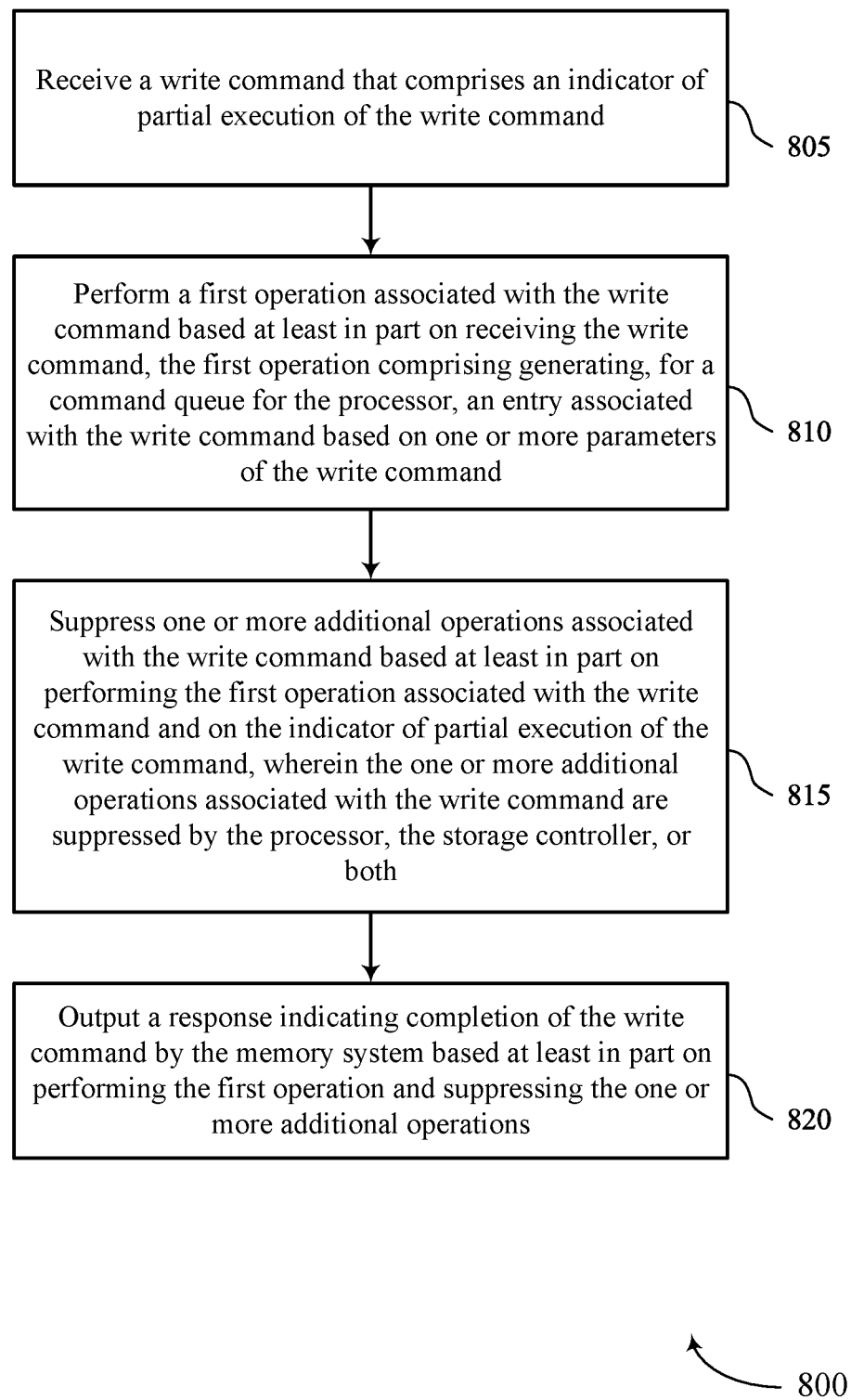

FIG. 8 shows a flowchart illustrating a method 800 that supports performance tuning for a memory device in accordance with examples as disclosed herein. The operations of method 800 may be implemented by a memory controller or its components as described herein. For example, the operations of method 800 may be performed by a memory controller as described with reference to FIGS. 1 through 4 and 6. In some examples, a memory controller may execute a set of instructions to control the functional elements of the device to perform the described functions. Additionally or alternatively, the memory controller may perform aspects of the described functions using special-purpose hardware.

At 805, a write command that includes an indicator of a partial execution of the write command may be received. For example, the write command may be received at an interface of a memory system that includes a processor and a storage controller. The operations of 805 may be performed in accordance with examples as disclosed herein. In some examples, aspects of the operations of 805 may be performed by a reception component 625 as described with reference to FIG. 6.

At 810, a first operation associated with the write command may be performed based at least in part on receiving the write command. The first operation may include generating an entry associated with the write command based on one or more parameters for the write command. For example, the interface may perform the first operation associated with the write command based at least in part on receiving the write command and the first operation may generate, for a command queue for the processor, an entry associated with the write command based on one or more parameters of the write command. The operations of 810 may be performed in accordance with examples as disclosed herein. In some examples, aspects of the operations of 810 may be performed by a command component 630 as described with reference to FIG. 6.

At 815, one or more additional operations associated with the write command may be suppressed based at least in part on the first operation associated with the write command being performed and the indicator of the partial execution of the write command. For example, the interface may perform the first operation associated with the write command and the one or more additional operations associated with the write command may be suppressed by the processor, the storage controller, or both. The operations of 815 may be performed in accordance with examples as disclosed herein. In some examples, aspects of the operations of 815 may be performed by a suppression component 635 as described with reference to FIG. 6.

At 820, a response indicating completion of the write command may be output based at least in part on the first operation being performed and suppressing the one or more additional operations. For example, the interface may output the response indicating completion of the write command by the memory system. The operations of 820 may be performed in accordance with examples as disclosed herein. In some examples, aspects of the operations of 820 may be performed by an output component 640 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 7: The apparatus, including features, circuitry, logic, means, or instructions, or any combination thereof for receiving a write command at an interface of a memory system that includes a processor and a storage controller, where the write command includes an indicator of partial execution of the write command; performing, by the interface, a first operation associated with the write command based at least in part on receiving the write command, the first operation including generating, for a command queue for the processor, an entry associated with the write command based on one or more parameters of the write command; suppressing one or more additional operations associated with the write command based at least in part on the interface performing the first operation associated with the write command and on the indicator of partial execution of the write command, where the one or more additional operations associated with the write command are suppressed by the processor, the storage controller, or both; and outputting, by the interface, a response indicating completion of the write command by the memory system based at least in part on performing the first operation and suppressing the one or more additional operations.

Aspect 8: The apparatus of aspect 7 where the indicator includes a first value and the method, apparatuses, and non-transitory computer-readable medium, further includes operations, features, circuitry, logic, means, or instructions, or any combination thereof for suppressing a second operation of the processor associated with the read command and a third operation of the storage controller associated with the write command based at least in part on the indicator including the first value, where outputting the response is based at least in part on the interface performing the first operation, the processor suppressing the second operation, and the storage controller suppressing the third operation.

Aspect 9: The apparatus of any of aspects 7 through 8 where the indicator includes a second value and the method, apparatuses, and non-transitory computer-readable medium, further includes operations, features, circuitry, logic, means, or instructions, or any combination thereof for retrieving, by the processor, the entry from the command queue based at least in part on the interface performing the first operation and the first value of the indicator; performing, by the processor, a second operation associated with the write command based at least in part on retrieving the entry from the command queue; and suppressing, by the storage controller, a third operation associated with the write command based at least in part on the indicator including the second value, where outputting the response is based at least in part on the interface performing the first operation, the processor performing the second operation, and the storage controller suppressing the third operation.

Aspect 10: The apparatus of aspect 9 where suppressing the third operation associated with the write command, further includes operations, features, circuitry, logic, means, or instructions, or any combination thereof for refraining from storing the entry associated with the write command to the second command queue.

Aspect 11: The apparatus of any of aspects 9 through 10, further including operations, features, circuitry, logic, means, or instructions, or any combination thereof for the second operation associated with the write command includes mapping a logical address associated with the write command to a physical address of the memory system.

Aspect 12: The apparatus of aspect 11, further including operations, features, circuitry, logic, means, or instructions, or any combination thereof for refraining from writing the data associated with the write command to one or more memory cells of the memory system based at least in part on suppressing the third operation associated with the write command.

Aspect 13: The apparatus of any of aspects 9 through 12, further including operations, features, circuitry, logic, means, or instructions, or any combination thereof for the third operation associated with the write command includes writing data to one or more non-volatile memory cells associated with the physical address of the memory system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory system that comprises an interface, one or more processors, and a storage controller, wherein:
the interface is configured to cause the apparatus to:
receive a read command that comprises an indicator of partial execution of the read command, the partial execution corresponding to a suppression of a first operation of a plurality of operations associated with the read command and performance of a second operation of the plurality of operations associated with the read command; and
perform the second operation associated with the read command based at least in part on receiving the read command, the second operation comprising generating, for a command queue for the one or more processors, an entry associated with the read command based on one or more parameters of the read command;
the storage controller is configured to cause the apparatus to:
suppress the first operation associated with the read command based at least in part on the interface performing the second operation and on the indicator of partial execution of the read command; and
the one or more processors are configured to cause the apparatus to:
output a response indicating completion of the read command based at least in part on the interface performing the second operation and the storage controller suppressing the first operation, wherein the response comprises filler data generated based at least in part on the storage controller suppressing the first operation.

2. The apparatus of claim 1, wherein the indicator comprises a first value, and wherein at least one of the one or more processors or the storage controller is configured to cause the apparatus to:
suppress a third operation of the one or more processors associated with the read command and a fourth operation of the storage controller associated with the read command based at least in part on the indicator comprising the first value, wherein outputting the response is based at least in part on the interface performing the second operation, the one or more processors suppressing the third operation, and the storage controller suppressing the fourth operation.

3. The apparatus of claim 1, wherein the indicator comprises a second value, and wherein:
the one or more processors are configured to cause the apparatus to:
retrieve the entry from the command queue based at least in part on the interface performing the second operation and the second value of the indicator; and
perform a third operation associated with the read command based at least in part on retrieving the entry from the command queue; and
the storage controller is configured to cause the apparatus to:
suppress a fourth operation associated with the read command based at least in part on the indicator comprising the second value, wherein outputting the response is based at least in part on the interface performing the second operation, the one or more processors performing the third operation, and the storage controller suppressing the fourth operation.

4. The apparatus of claim 3, wherein the third operation associated with the read command comprises mapping a logical address associated with the read command to a physical address of the memory system.

5. The apparatus of claim 4, wherein the fourth operation associated with the read command comprises reading data from one or more non-volatile memory cells associated with the physical address of the memory system.

6. The apparatus of claim 1, wherein the storage controller comprises a second command queue, and wherein the storage controller is configured to suppress the first operation associated with the read command by:
refraining from storing the entry associated with the read command to the second command queue.

7. An apparatus, comprising:
a memory system that comprises an interface, one or more processors, and a storage controller, wherein:
the interface is configured to cause the apparatus to:
receive a write command that comprises an indicator of partial execution of the write command, the partial execution corresponding to a suppression of a first operation of a plurality of operations associated with the write command and performance of a second operation of the plurality of operations associated with the write command; and
perform the second operation associated with the write command based at least in part on receiving the write command, the second operation comprising generating, for a command queue for the one or more processors, an entry associated with the write command based on one or more parameters of the write command; and
the storage controller is configured to cause the apparatus to:
suppress the first operation associated with the write command based at least in part on the interface performing the second operation and on the indicator of partial execution of the write command; and
the one or more processors are configured to cause the apparatus to:
output a response indicating completion of the write command based at least in part on the interface performing the second operation and the storage controller suppressing the first operation.

8. The apparatus of claim 7, wherein the indicator comprises a first value, and wherein at least one of the one or more processors or the storage controller is configured to cause the apparatus to:
suppress a third operation of the one or more processors associated with the write command and a fourth operation of the storage controller associated with the write command based at least in part on the indicator comprising the first value, wherein outputting the response is based at least in part on the interface performing the second operation, the one or more processors suppressing the third operation, and the storage controller suppressing the fourth operation.

9. The apparatus of claim 7, wherein the indicator comprises a second value, and wherein:
the one or more processors are configured to cause the apparatus to:
retrieve the entry from the command queue based at least in part on the interface performing the second operation and the second value of the indicator; and
perform a third operation associated with the write command based at least in part on retrieving the entry from the command queue; and
the storage controller is configured to cause the apparatus to:
suppress a fourth operation associated with the write command based at least in part on the indicator comprising the second value, wherein outputting the response is based at least in part on the interface performing the second operation, the one or more processors performing the third operation, and the storage controller suppressing the fourth operation.

10. The apparatus of claim 9, wherein the third operation associated with the write command comprises mapping a logical address associated with the write command to a physical address of the memory system.

11. The apparatus of claim 10, wherein at least one of the one or more processors or the storage controller is configured to cause the apparatus to:
refrain from writing data associated with the write command to one or more memory cells of the memory system based at least in part on suppressing the fourth operation associated with the write command.

12. The apparatus of claim 10, wherein the fourth operation associated with the write command comprises writing data to one or more non-volatile memory cells associated with the physical address of the memory system.

13. The apparatus of claim 7, wherein the storage controller comprises a second command queue, and wherein the storage controller is configured to suppress the first operation associated with the write command by:
refraining from storing the entry associated with the write command to the second command queue.

14. A non-transitory computer-readable medium storing code comprising instructions which, when executed by one or more processors of an electronic device, cause the electronic device to:
receive a read command at an interface of a memory system that comprises one or more second processors and a storage controller, wherein the read command comprises an indicator of partial execution of the read command, the partial execution corresponding to a suppression of a first operation of a plurality of operations associated with the read command and performance of a second operation of the plurality of operations associated with the read command;
perform, by the interface, the second operation associated with the read command based at least in part on receiving the read command, the second operation comprising generating, for a command queue for the one or more second processors, an entry associated with the read command based on one or more parameters of the read command;
suppress, by the storage controller, the first operation associated with the read command based at least in part on the interface performing the second operation and on the indicator of partial execution of the read command; and
output, by the interface, a response indicating completion of the read command by the memory system based at least in part on the interface performing the second operation and the storage controller suppressing the first operation, wherein the response comprises filler data generated based at least in part on the storage controller suppressing the first operation.

15. The non-transitory computer-readable medium of claim 14, wherein the indicator comprises a first value, and wherein the instructions, when executed by the one or more processors of the electronic device, further cause the electronic device to:

suppress a third operation of the one or more second processors associated with the read command and a fourth operation of the storage controller associated with the read command based at least in part on the indicator comprising the first value, wherein outputting the response is based at least in part on the interface performing the second operation, the one or more second processors suppressing the third operation, and the storage controller suppressing the fourth operation.

16. The non-transitory computer-readable medium of claim 14, wherein the indicator comprises a second value, and wherein the instructions, when executed by the one or more processors of the electronic device, further cause the electronic device to:

retrieve, by the one or more second processors, the entry from the command queue based at least in part on the interface performing the second operation and the second value of the indicator;

perform, by the one or more second processors, a third operation associated with the read command based at least in part on retrieving the entry from the command queue; and suppress, by the storage controller, a fourth operation associated with the read command based at least in part on the indicator comprising the second value, wherein outputting the response is based at least in part on the interface performing the second operation, the one or more second processors performing the third operation, and the storage controller suppressing the fourth operation.

17. The non-transitory computer-readable medium of claim 16, wherein the third operation associated with the read command comprises mapping a logical address associated with the read command to a physical address of the memory system.

18. The non-transitory computer-readable medium of claim 17, wherein the fourth operation associated with the read command comprises reading data from one or more non-volatile memory cells associated with the physical address of the memory system.

19. The non-transitory computer-readable medium of claim 14, wherein the instructions to suppress the first operation associated with the read command, when executed by the one or more processors of the electronic device, further cause the electronic device to:

refrain from storing the entry associated with the read command to a storage queue.

20. A non-transitory computer-readable medium storing code comprising instructions which, when executed by one or more processors of an electronic device, cause the electronic device to:

receive a write command at an interface of a memory system that comprises one or more second processors and a storage controller, wherein the write command comprises an indicator of partial execution of the write command, the partial execution corresponding to a suppression of a first operation of a plurality of operations associated with the write command and performance of a second operation of the plurality of operations associated with the write command;

perform, by the interface, the second operation associated with the write command based at least in part on receiving the write command, the second operation comprising generating, for a command queue for the one or more second processors, an entry associated with the write command based on one or more parameters of the write command;

suppress, by the storage controller, the first operation associated with the write command based at least in part on the interface performing the second operation associated with the write command and on the indicator of partial execution of the write command; and output, by the interface, a response indicating completion of the write command by the memory system based at least in part on the interface performing the second operation and the storage controller suppressing the first operation.

21. The non-transitory computer-readable medium of claim 20, wherein the indicator comprises a first value, and wherein the instructions, when executed by the one or more processors of the electronic device, further cause the electronic device to:

suppress a third operation of the one or more second processors associated with the write command and a fourth operation of the storage controller associated with the write command based at least in part on the indicator comprising the first value, wherein outputting the response is based at least in part on the interface performing the second operation, the one or more second processors suppressing the third operation, and the storage controller suppressing the fourth operation.

22. The non-transitory computer-readable medium of claim 20, wherein the indicator comprises a second value, and wherein the instructions, when executed by the one or more processors of the electronic device, further cause the electronic device to:

retrieve, by the one or more second processors, the entry from the command queue based at least in part on the interface performing the second operation and the second value of the indicator;

perform, by the one or more second processors, a third operation associated with the write command based at least in part on retrieving the entry from the command queue; and suppress, by the storage controller, a fourth operation associated with the write command based at least in part on the indicator comprising the second value, wherein outputting the response is based at least in part on the interface performing the second operation, the one or more second processors performing the third operation, and the storage controller suppressing the fourth operation.

23. The non-transitory computer-readable medium of claim 22, wherein the third operation associated with the write command comprises mapping a logical address associated with the write command to a physical address of the memory system.

24. The non-transitory computer-readable medium of claim 23, wherein the instructions, when executed by the one or more processors of the electronic device, further cause the electronic device to:

refrain from writing data associated with the write command to one or more memory cells of the memory system based at least in part on suppressing the fourth operation associated with the write command.

25. The non-transitory computer-readable medium of claim 20, wherein the instructions to suppress the first operation associated with the write command, when executed by the one or more processors of the electronic device, further cause the electronic device to:

refrain from storing the entry associated with the write command to a storage queue.

\* \* \* \* \*